(12) United States Patent
Sasaki et al.

(10) Patent No.: US 9,407,822 B2
(45) Date of Patent: Aug. 2, 2016

(54) IMAGE CAPTURING APPARATUS CAPABLE OF REDUCING TIME TAKEN TO DISPLAY IMAGE ON DISPLAY AND METHOD OF CONTROLLING THE SAME

(71) Applicant: CANON KABUSHIKI KAISHA, Tokyo (JP)

(72) Inventors: Koichi Sasaki, Yokohama (JP); Nobuyuki Matsuyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 23 days.

(21) Appl. No.: 14/208,382

(22) Filed: Mar. 13, 2014

(65) Prior Publication Data

US 2014/0285692 A1 Sep. 25, 2014

(30) Foreign Application Priority Data

Mar. 25, 2013 (JP) ................................. 2013-062860
Feb. 19, 2014 (JP) ................................. 2014-029968

(51) Int. Cl.
| | |
|---|---|
| H04N 5/343 | (2011.01) |
| H04N 5/345 | (2011.01) |
| H04N 5/232 | (2006.01) |
| H04N 9/07 | (2006.01) |
| G02B 27/00 | (2006.01) |

(52) U.S. Cl.
CPC ........ *H04N 5/23245* (2013.01); *G02B 27/0075* (2013.01); *H04N 5/343* (2013.01); *H04N 5/3452* (2013.01); *H04N 5/3456* (2013.01); *H04N 9/07* (2013.01)

(58) Field of Classification Search
CPC ..................................................... H04N 5/374
USPC ........................................................... 348/281
See application file for complete search history.

(56) References Cited

U.S. PATENT DOCUMENTS

| 8,711,269 B2 * | 4/2014 | Ohno .................... H04N 5/2254 348/222.1 |
|---|---|---|
| 2009/0109323 A1 * | 4/2009 | Muraki et al. ................. 348/362 |
| 2010/0045844 A1 * | 2/2010 | Yamamoto ........... H04N 5/2254 348/340 |
| 2011/0267533 A1 * | 11/2011 | Hirose ........................... 348/345 |

OTHER PUBLICATIONS

Ren Ng, et al., Light Field Photography with a Hand-held Plenoptic Camera, Stanford Tech Report CTSR, Feb. 2005.

* cited by examiner

*Primary Examiner* — Twyler Haskins
*Assistant Examiner* — Fayez Bhuiyan
(74) *Attorney, Agent, or Firm* — Cowan, Liebowitz & Latman, P.C.

(57) ABSTRACT

An image capturing apparatus comprises a lens array, an image sensor, a display unit, a recording unit configured to record the video data read out from the image sensor, a readout control unit which has a first readout mode of reading out video data of pixels in first regions coinciding with a position relative to each lens and a second readout mode of reading out video data of pixels in second regions, and a control unit configured to perform control, upon reading out video data from the image sensor in the first readout mode, to read out video data from the image sensor in the second readout mode and display a video obtained from the video data read out in the first readout mode, and to record the video data read out in the second readout mode.

9 Claims, 11 Drawing Sheets

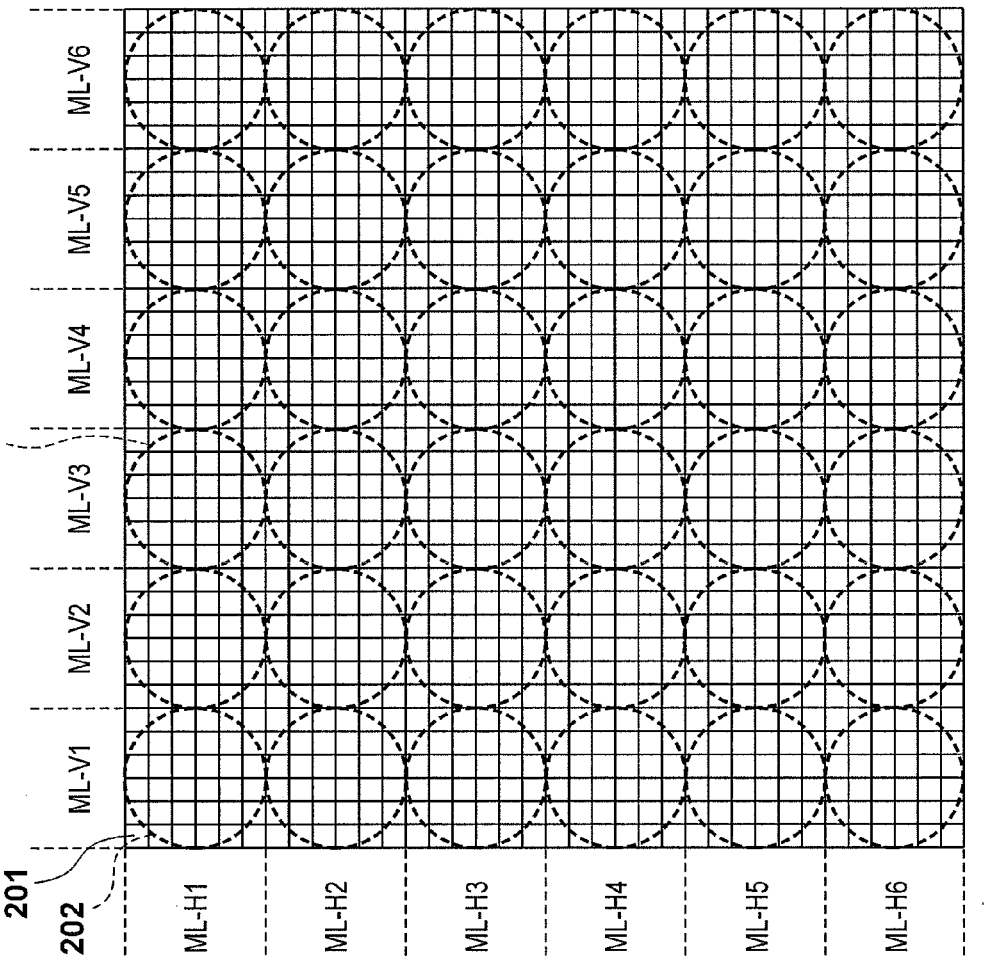
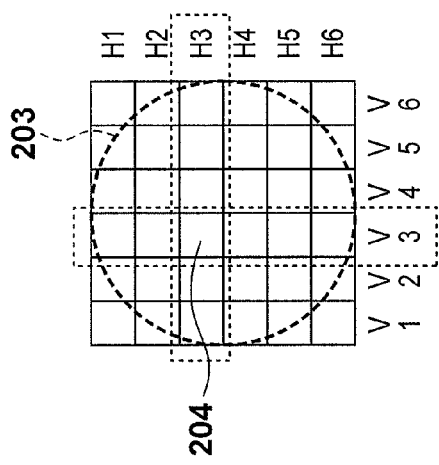
FIG. 2A
FIG. 2B

F I G. 8A
F I G. 8B
F I G. 8C
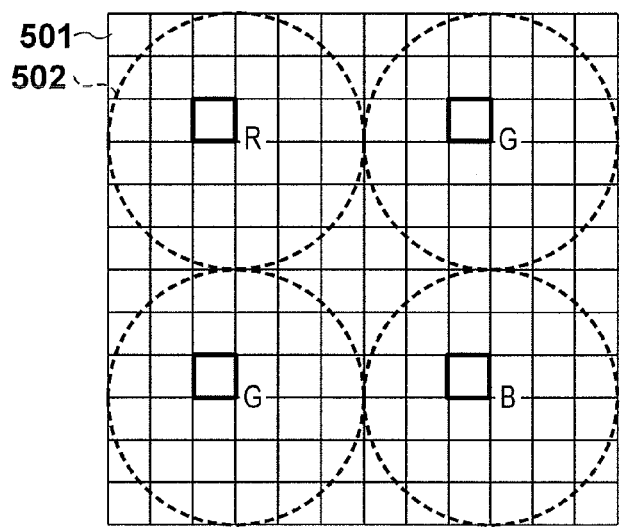

IMAGE CAPTURING APPARATUS CAPABLE OF REDUCING TIME TAKEN TO DISPLAY IMAGE ON DISPLAY AND METHOD OF CONTROLLING THE SAME

BACKGROUND OF THE INVENTION

1. Field of the Invention

The present invention relates to an image capturing apparatus such as a digital camera or digital video camera.

2. Description of the Related Art

Recently, there has been proposed an image capturing apparatus configured to obtain the incident direction information of light in addition to the intensity of light on the light-receiving surface of a solid-state image sensor, on which a light beam is incident, by arranging a microlens array at a rate of one microlens for a plurality of pixels on the front surface of the image sensor. Such an image capturing apparatus is a so-called plenoptic image capturing apparatus, which is disclosed in, for example, Ren. Ng, and seven others, "Light Field Photography with a Hand-Held Plenoptic Camera", Stanford Tech Report CTSR 2005-02".

In addition, many products used as viewfinders to determine compositions at the time of image capturing have been conventionally developed, which display object images on display devices such as liquid crystal panels arranged on the rear surfaces of image capturing apparatuses such as digital cameras.

When, however, reading out video data captured by an image sensor and outputting the data to a display device, there is a temporal delay between the object image displayed on the display device and the actual object due to a processing time for display. As the number of pixels of an image sensor increases, the amount of readout processing from the image sensor increases. This makes the delay between an actual object and a displayed video noticeable.

In addition, as a pixel readout method for an image sensor, there is a general method of performing readout operation by a raster scan scheme. This scheme is configured to perform pixel readout operation sequentially in the rightward direction from the upper left of an image, read out pixels corresponding to one line up to the right end of the screen, and then perform pixel readout operation again from the left end of the screen, one line below the previous line, in the rightward direction. The scheme is configured to repeatedly perform the above series of readout processing up to the lower right of the image. However, forming a video to be used for display upon reading out pixels at all the field angles will greatly increase the delay between the actual object and the video to be displayed. For this reason, there has been proposed a technique of forming an image used for display by skipping pixels, within field angles to be used for display, on a row and column basis.

The following problem arises in an image sensor in which a microlens array is arranged. That is, it is not possible to form an expected display image by skipping pixels of an image sensor at predetermined intervals on a row and column basis without considering the arrangement of a microlens array and the relationship between the microlenses and the respective pixels.

SUMMARY OF THE INVENTION

The present invention has been made in consideration of the above problem and shortens the time taken to display an image of an object on a display device in a plenoptic image capturing apparatus.

According to the first aspect of the present invention, an image capturing apparatus comprises a lens array in which a plurality of lenses are arrayed; an image sensor which is arranged to make light transmitted through each lens of the lens array be incident on a plurality of pixels; a display unit configured to display video data read out from the image sensor; a recording unit configured to record the video data read out from the image sensor; a readout control unit which has a first readout mode of reading out video data of pixels in first regions coinciding with a position relative to each lens of the lens array from the image sensor and a second readout mode of reading out video data of pixels in second regions from the image sensor; and a control unit configured to perform control, upon reading out video data from the image sensor in the first readout mode, to read out video data from the image sensor in the second readout mode and display, on the display unit, a video obtained from the video data read out in the first readout mode, and to record the video data read out in the second readout mode on the recording unit.

According to the second aspect of the present invention, a method of controlling an image capturing apparatus including a lens array in which a plurality of lenses are arrayed and an image sensor which is arranged to make light transmitted through each lens of the lens array be incident on a plurality of pixels, comprises a display step of displaying video data read out from the image sensor; a recording step of recording the video data read out from the image sensor; a readout control step having a first readout mode of reading out video data of pixels in first regions coinciding with a position relative to each lens of the lens array from the image sensor and a second readout mode of reading out video data of pixels in second regions from the image sensor; and a control step of performing control, upon reading out video data from the image sensor in the first readout mode, to read out video data from the image sensor in the second readout mode and display, in the display step, a video obtained from the video data read out in the first readout mode, and to record the video data read out in the second readout mode on the recording unit.

Further features of the present invention will become apparent from the following description of exemplary embodiments with reference to the attached drawings.

BRIEF DESCRIPTION OF THE DRAWINGS

FIG. 2A is a view showing the arrangement relationship between microlenses and pixels;

FIG. 2B is a view showing the arrangement relationship between a microlens and pixels;

FIG. 8A is a view showing the arrangement relationship between microlenses, pixels, and color filters;

FIG. 8B is a view showing the arrangement relationship between microlenses, pixels, and color filters;

FIG. 8C is a view showing the arrangement relationship between microlenses, pixels, and color filters;

DESCRIPTION OF THE EMBODIMENTS

Embodiments of the present invention will be described in detail below with reference to the accompanying drawings.

First Embodiment

Figure 1:
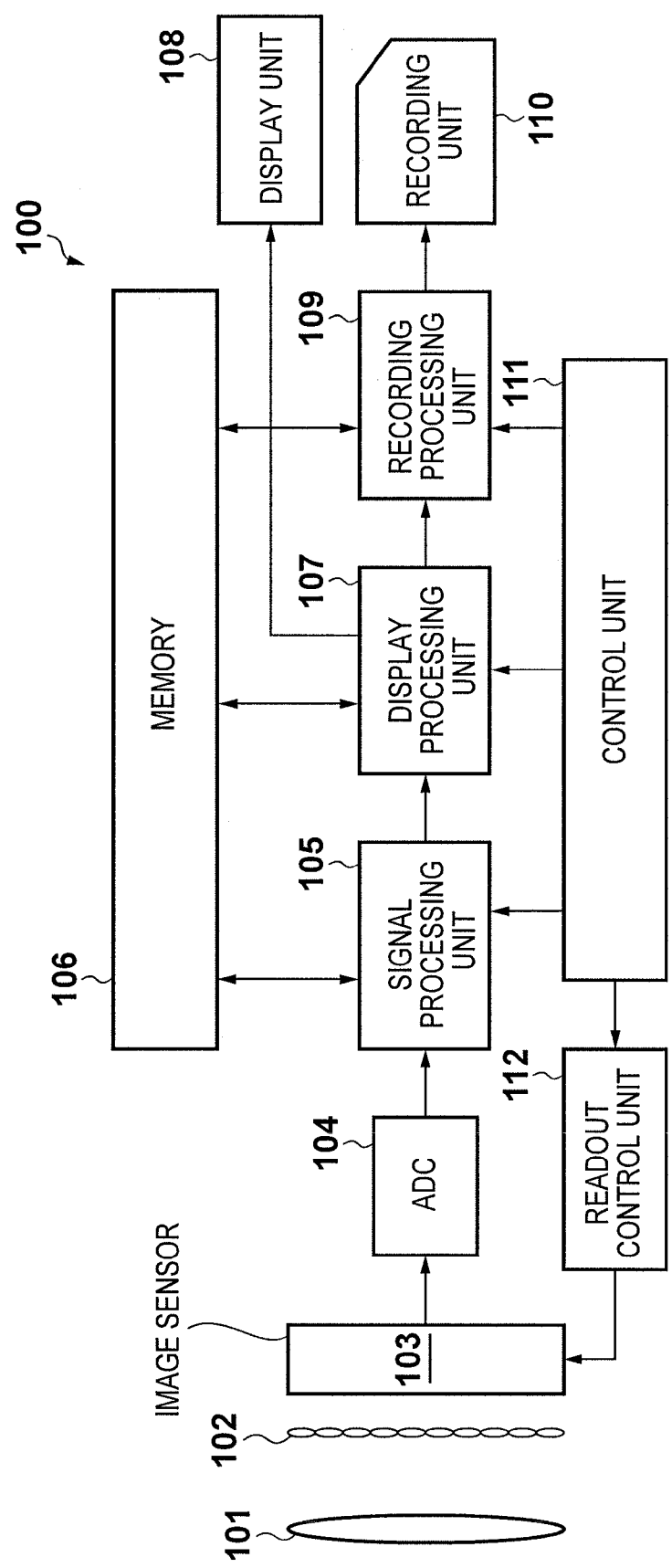
FIG. 1 is a block diagram showing the arrangement of an image capturing apparatus according to the first embodiment of the present invention.

FIG. 1 is a block diagram showing the arrangement of an image capturing apparatus according to the first embodiment of the present invention. Referring to FIG. 1, an image capturing apparatus 100 includes a lens system 101 including a zoom lens and a focus lens, and an image sensor 103 which photoelectrically converts the object image formed by being transmitted through the lens system 101. The image sensor 103 includes photoelectric conversion elements and a microlens array 102 two-dimensionally arranged in a matrix pattern on the photoelectric conversion elements. In addition, the image capturing apparatus 100 includes a readout control unit 112 which performs signal readout control on the image sensor 103 and an A/D conversion unit 104 which converts the electrical signal read out from the image sensor 103 from the analog signal to a digital signal (video data). The image capturing apparatus 100 also includes a signal processing unit 105 which performs various types of correction processing for the video signal converted into the digital signal, image processing such as white balance processing and gamma correction processing, and resolution conversion processing. The image capturing apparatus 100 further includes a memory 106 which temporarily records data in each process, a display processing unit 107 which performs conversion processing to a display format, and a display unit 108 which displays a video output signal from the display processing unit 107. Furthermore, the image capturing apparatus 100 includes a recording processing unit 109 which performs encoding processing and conversion processing to a recording format, a recording unit 110 which records a video signal from the recording processing unit 109, and a control unit 111 which controls various types of processing.

Figure 2C:
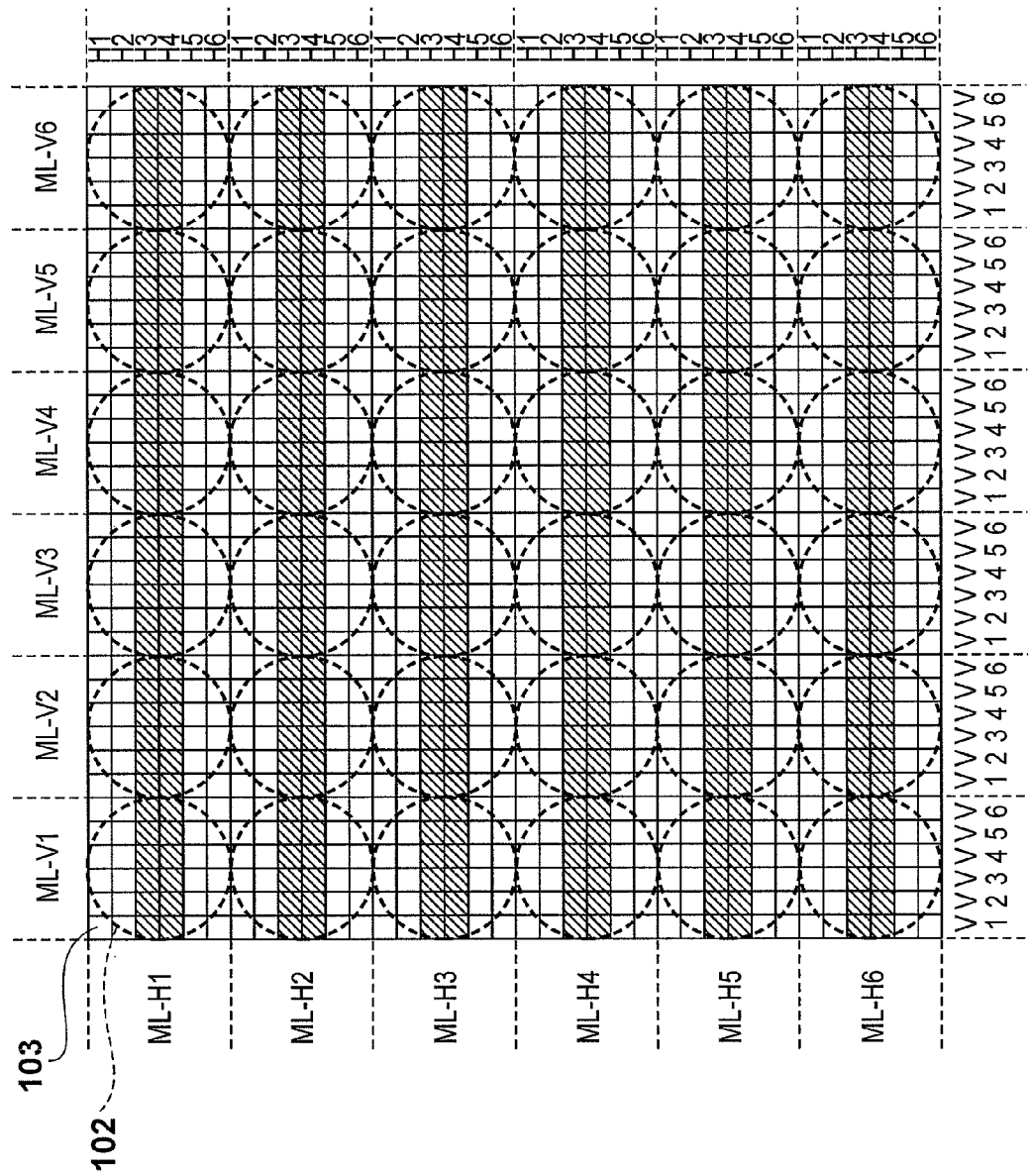
FIG. 2C is a view showing the arrangement relationship between microlenses and pixels.

Of the above arrangements, the arrangement of the microlens array 102 and image sensor 103 will be described in detail. FIGS. 2A to 2C show the arrangement of the microlens array 102 and image sensor 103 when viewed from the direction of the lens system 101.

As shown in FIG. 2A, the microlens array 102 has a plurality of microlenses arrayed regularly and two-dimensionally on the image sensor 103. In this embodiment, 36 microlenses are arranged in 6 rows×6 columns, and the array positions of the respective microlenses are represented as follows. The respective rows are represented as ML-H1, ML-H2, ML-H3, . . . , ML-H6, and the respective columns are represented as ML-V1, ML-V2, ML-V3, . . . , ML-V6. For example, the array position of a microlens 203 on the row ML-H1 and the column ML-V3 is represented as ML-H1V3.

In addition, the image sensor 103 has pixels 201 two-dimensionally arrayed in a matrix pattern. FIG. 2B shows the array positions of pixels at one microlens. In this embodiment, one microlens is arranged to correspond to 6 rows×6 columns=36 pixels (the number of pixels on one side of a pixel group corresponding to one microlens is 6). Letting H1, H2, H3, . . . , H6 be rows and V1, V2, V3, . . . , V6 be columns, the array position of a pixel 204 on the row H3 and the column V3 which are enclosed by the broken lines can be represented as H3V3.

In the case of the microlens 203 arranged at the position ML-H1V3 in FIG. 2A, the pixel 204 can be represented as ML-H1V3-H3V3. Likewise, the row H3 at which the microlens 203 is positioned can be represented as ML-H1V3-H3, and the column V3 can be represented as ML-H1V3-V3.

The operation of the image capturing apparatus having the above arrangement will be described next. First of all, the lens system 101 drives the lens via a lens system control unit (not shown) to receive image light set to a proper brightness at a predetermined field angle. The lens system 101 then forms the image light of an object, which is incident through the microlens array 102, into an image on the image sensor 103. The image sensor 103 is driven by a driving pulse based on a control signal from the readout control unit 112 to photoelectrically convert the formed image into an electrical signal. The ADC 104 converts the video signal, converted into the electrical signal, into a digital signal. The signal processing unit 105 performs various types of processing for the signal and stores the resultant signal in the memory 106. The display processing unit 107 converts the video signal stored in the memory 106 into an image corresponding to the display unit 108 as a display device. That is, the display processing unit 107 performs resolution conversion processing to a resolution to which the display unit 108 corresponds. In addition, the display processing unit 107 performs timing control for a display image to output data to the display unit 108 at a timing matched with a display frame rate. The recording processing unit 109 performs recording processing for still and moving images. Upon converting the images into a still image format and a moving image format, the recording processing unit 109 records the resultant data on the recording unit 110 as a recording medium such as an SD card. Note that the recording unit 110 may be an optical disk such as a DVD, a magnetic disk such as an HDD, or a recording apparatus located in a place separated from the image capturing apparatus and connected to it via a network or the like, instead of an SD card.

An example of control performed by the readout control unit 112 will be described next. Readout control in the pixel arrangement of one microlens shown in FIG. 2B will be described with reference to FIGS. 2C and 3, in which the readout control unit 112 preferentially reads out the pixels on the rows H3 and H4 which constitute a central portion of the microlens, and then reads out the pixels on the remaining rows H1, H2, H5, and H6.

The readout control unit 112 performs readout control (the first readout mode) on the image sensor 103 so as to preferentially read out the pixels on a row ML-H1-H3, a row ML-H1-H4, a row ML-H2-H3, a row ML-H2-H4, a row ML-H3-H3, a row ML-H3-H4, a row ML-H4-H3, a row ML-H4-H4, a row ML-H5-H3, a row ML-H5-H4, a row ML-H6-H3, and a row ML-H6-H4, which are indicated by the hatchings in FIG. 2C and coincide with each other in position relative to the respective lenses of the microlens array 102. That is, in the first readout mode, the readout control unit 112 partially reads out pixels near the center of each microlens.

Figure 3:
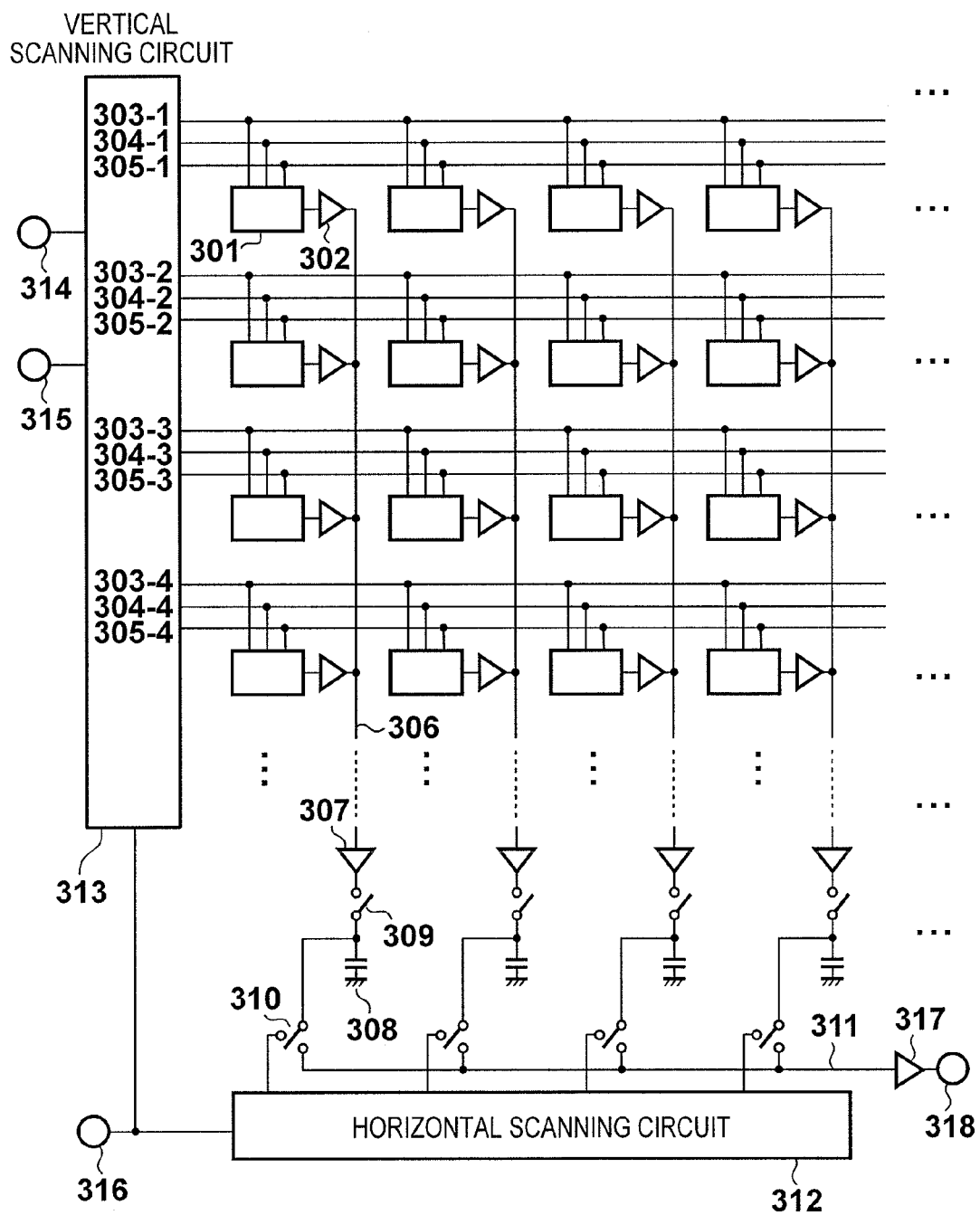
FIG. 3 is a circuit diagram showing the arrangement of a CMOS sensor.

Readout processing for the image sensor will be described next with reference to FIG. 3, which uses, like a CMOS image sensor, a so-called XY address readout scheme capable of extracting arbitrary pixel data by reading out each data by designating the address (X-Y) of each pixel.

The image sensor 103 includes pixels 301 (the xth row, yth column pixel is written as 301-*yx*) and floating diffusion amplifiers 302 (to be abbreviated as FD amplifiers hereinafter and the xth row, yth column amplifier is written as 302-*yx*). The image sensor 103 also includes row readout control lines 303 (the xth row control line is written as 303-*x*), row reset control lines 304 (the xth row control line is written as 304-*x*), and row selection lines 305 (the xth row selection line is written as 305-*x*). The image sensor 103 also includes column signal lines 306 (the yth column signal line is written as 306-*y*), column amplifiers 307 (the yth column amplifier is written as 307-*y*), and column signal buffer capacitors 308 (the yth column capacitor is written as 308-*y*) which charge the outputs of the column amplifiers 307. The image sensor 103 also includes column signal buffer capacitor control switches 309 (the yth column switch 309-*y*) for turning ON/OFF charging of the column signal buffer capacitors 308. The image sensor 103 also includes column selection switches 310 (the yth column switch is written as 310-*y*) for sequentially outputting the signals charged to the column signal buffer capacitors 308 to a horizontal signal line 311. The image sensor 103 also includes a horizontal scanning circuit 312, a vertical scanning circuit 313, a vertical synchronization signal input terminal 314, a readout start row setting input terminal 315, a horizontal synchronization signal input terminal 316, an output buffer amplifier 317, and a video signal output terminal 318.

A case in which data are read out from the CMOS image sensor line by line will be described next. The charges in pixels 301-13, 301-23, 301-33, and 301-43 on the third row corresponding to the row ML-H1-H3 are read out to FD amplifiers 302-13, 302-23, 302-33, and 302-43 under the control of a row readout control line 303-3. Column amplifiers 307-1, 307-2, 307-3, and 307-4 amplify outputs from the FD amplifiers 302-13, 302-23, 302-33, and 302-43 via column signal lines 306-1, 306-2, 306-3, and 306-4 upon being selected under the control of a row selection line 305-3. At the same time, column signal buffer capacitor control switches 309-1, 309-2, 309-3, and 309-4 are turned on. Outputs from the column amplifiers 307-1, 307-2, 307-3, and 307-4 are then charged to column signal buffer capacitors 308-1, 308-2, 308-3, and 308-4. After the column signal buffer capacitors 308-1, 308-2, 308-3; and 308-4 are charged, the column signal buffer capacitor control switches 309-1, 309-2, 309-3, and 309-4 are turned off. The third row signals charged to the column signal buffer capacitors 308-1, 308-2, 308-3, and 308-4 are output as follows. That is, the apparatus sequentially opens/closes column selection switches 310-1, 310-2, 310-3, and 310-4 under the control of the horizontal scanning circuit 312 to output the signals from the video signal output terminal 318 via the horizontal signal line 311 and output buffer amplifier 317. Upon reading out the third row signals in the above manner, the apparatus sequentially reads out signals from the row Ml-H1-H4 corresponding to the fourth row, the row ML-H2-H3 corresponding to the ninth row, and the row ML-H2-H4 corresponding to the 10th row in the same as described above.

In addition, the apparatus resets the charges in the pixels 301-*yx* on the respective rows under the control the row reset control lines 304-*x*. The time taken to perform next charge readout operation under the control of the row readout control lines 303-*x* after the resetting operation corresponds to the accumulation time of each row in the next frame. Upon performing readout processing for the third and fourth rows at the microlenses arrayed on the last row, the apparatus causes the signal processing unit 105 to perform various types of processing for a one-frame video signal to be displayed on the display unit 108, and then stores the resultant signal in the memory 106.

Upon performing readout processing for the third and fourth rows at the microlenses arrayed on the last row, the apparatus performs readout operation for the pixels on the rows other than the third and fourth rows at the microlenses arrayed on the first row, namely the first, second, fifth, and sixth rows, to continuously read out pixels necessary for the recording processing unit 109. Subsequently, the apparatus reads out the pixels located on the respective rows at the microlenses arrayed on the second row, and performs similar pixel readout processing for the microlenses arrayed on the last row (second readout mode).

Upon completing pixel readout operation on the sixth row at the microlenses arrayed on the last row, the apparatus causes the signal processing unit 105 to perform various types of processing for a one-frame video signal to be recorded on the recording unit, and stores the resultant data in the memory 106.

Figure 4:
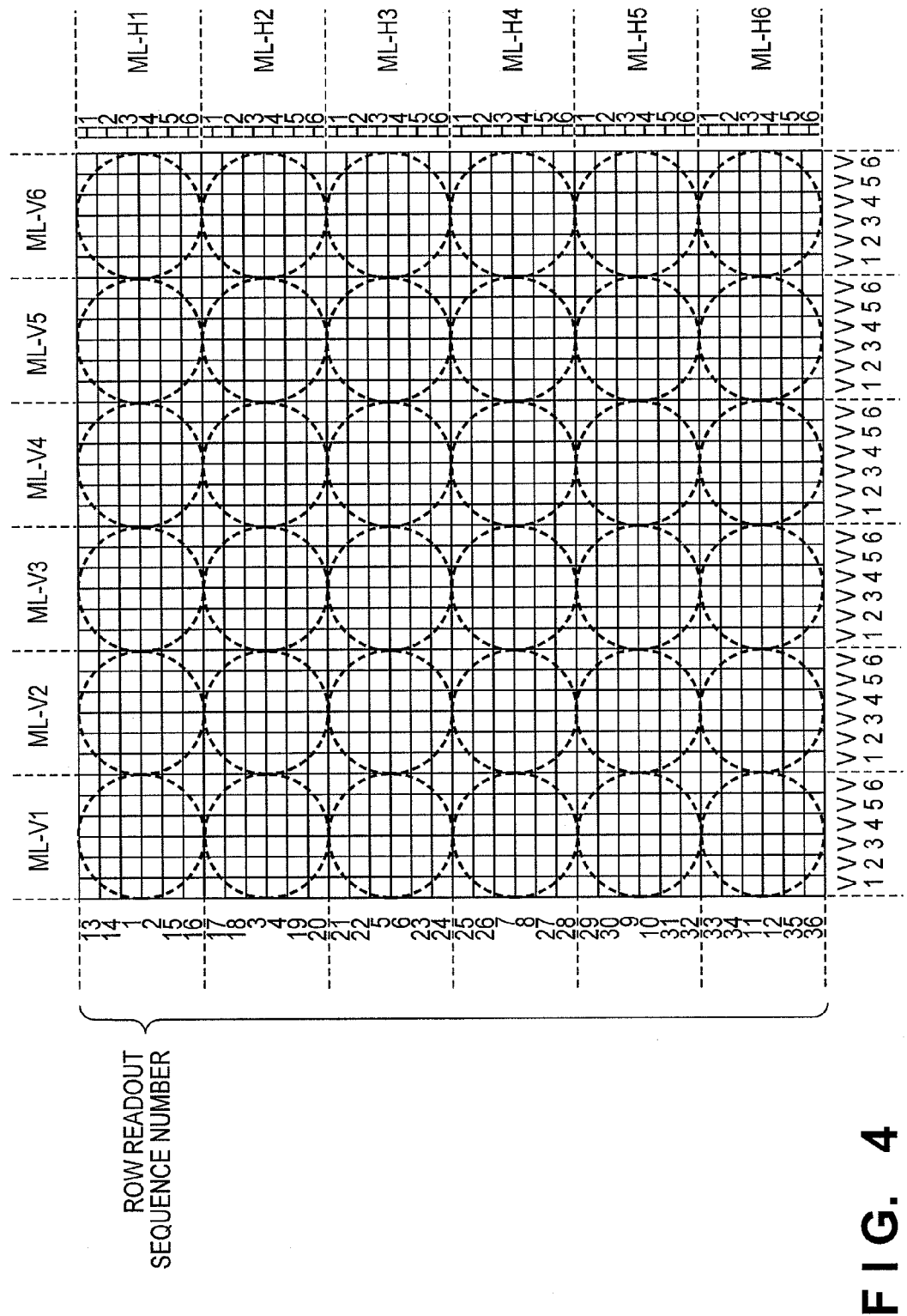
FIG. 4 is a view for explaining a row readout sequence on an image sensor.

The sequence of this series of readout processing will be described with reference to FIG. 4 showing an arrangement in which one field angle corresponds to 6×6 microlenses and is constituted by a total of 1,296 pixels, with 6×6 pixels being arranged per microlens.

A readout sequence at the time of performing control to preferentially read out the third and fourth rows for each microlens will be described. The apparatus reads out the row ML-H1-H3 first (row readout sequence number: 1), and then reads out the row ML-H1-H4 second (row readout sequence number: 2). Subsequently, the apparatus reads out the row ML-H2-H3, the row ML-H2-H4, the row ML-H3-H3, the row ML-H3-H4, the row ML-H4-H3, the row ML-H4-H4, the row ML-H5-H3, the row ML-H5-H4, the row ML-H6-H3, and the row ML-H6-H4 (row readout sequence numbers: 3 to 12).

Upon performing readout operation with respect to the microlenses on the last row, the apparatus performs readout control for the microlenses on the first row concerning unread rows. The apparatus reads out the row ML-H1-H1, the row ML-H1-H2, the row ML-H1-H5, and the row ML-H1-H6 (row readout sequence numbers: 13 to 16). Likewise, the apparatus reads out the unread rows at the microlenses on the second row (row readout sequence numbers: 17 to 20), on the third row (row readout sequence numbers: 21 to 24), on the fourth row (row readout sequence numbers: 25 to 28), on the fifth row (row readout sequence numbers: 29 to 32), and on the sixth row (row readout sequence numbers: 33 to 36).

Figure 5:
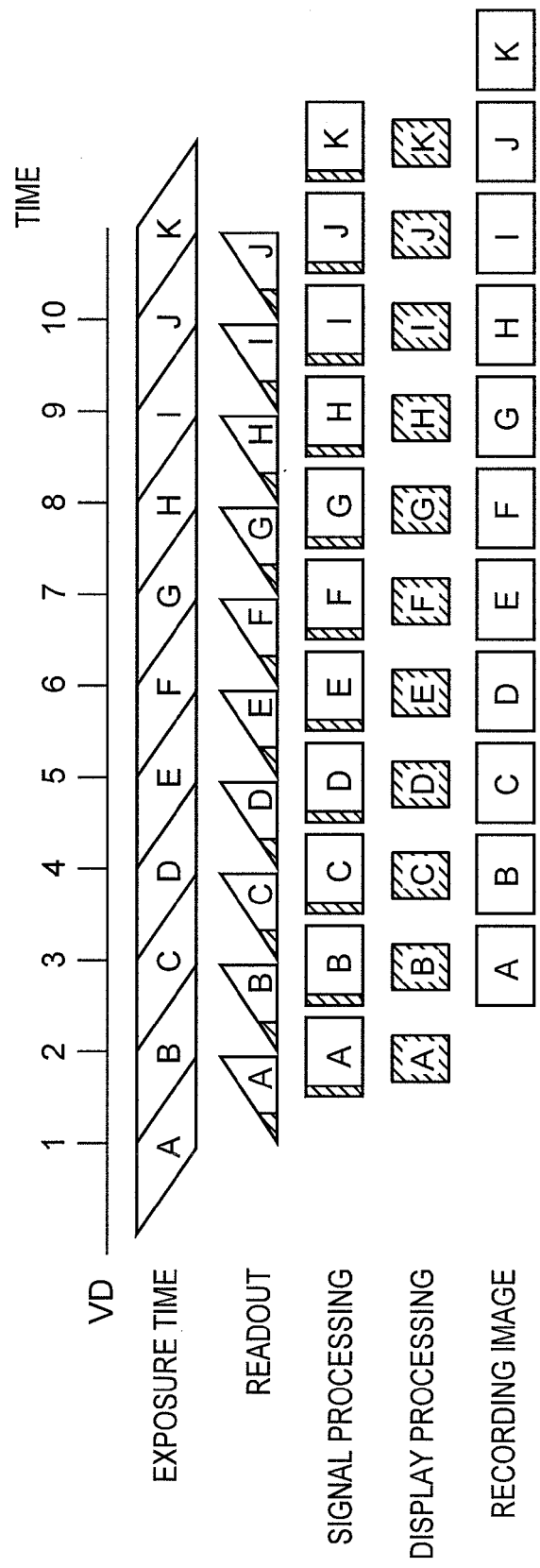
FIG. 5 is a timing chart for readout control on the image sensor, display processing, and recording processing.

Readout control on the above image sensor and the processing timings of display and recording processing for the display unit for each frame will be described with reference to FIG. 5. Reference symbol VD denotes a vertical synchronization signal which delimits the frame. Image light is incident on the image sensor 103 for each frame to form an image. With the above readout control, the apparatus preferentially reads out pixels in descending order of readout priority for each microlens. The preferentially readout pixels are indicated by the hatchings in FIG. 5. The signal processing unit 105 performs various types of processing for the preferentially readout pixels. The display processing unit 107 performs display processing for the processed pixels and then displays the resultant image on the display unit 108. The recording processing unit 109 performs recording processing for the recording image obtained by combining the pixels preferentially read out by the readout control unit 112 with all the remaining pixels, and records the resultant data on the recording unit 110.

Assigning priority levels to readout pixel positions for each microlens and performing readout processing in this manner can suppress a display delay with respect to the display unit and improve the sense of usage when the user performs image capturing while seeing the video displayed on the display unit at the time of image capturing.

Second Embodiment

The second embodiment of the present invention will be described next. In the first embodiment described above, the readout control unit 112 performs readout control on the image sensor line by line. However, it is possible to perform readout operation from the image sensor pixel by pixel.

Pixel positions at which readout operation is preferentially performed will be described with reference to FIG. 6. Readout control in the pixel arrangement of one microlens shown in FIG. 6 will be described. The apparatus preferentially reads out the pixels (first regions) on rows H3 and H4 and columns V3 and V4 which correspond to a central portion of the microlens, and then reads out the remaining pixels (second regions).

Figure 6:
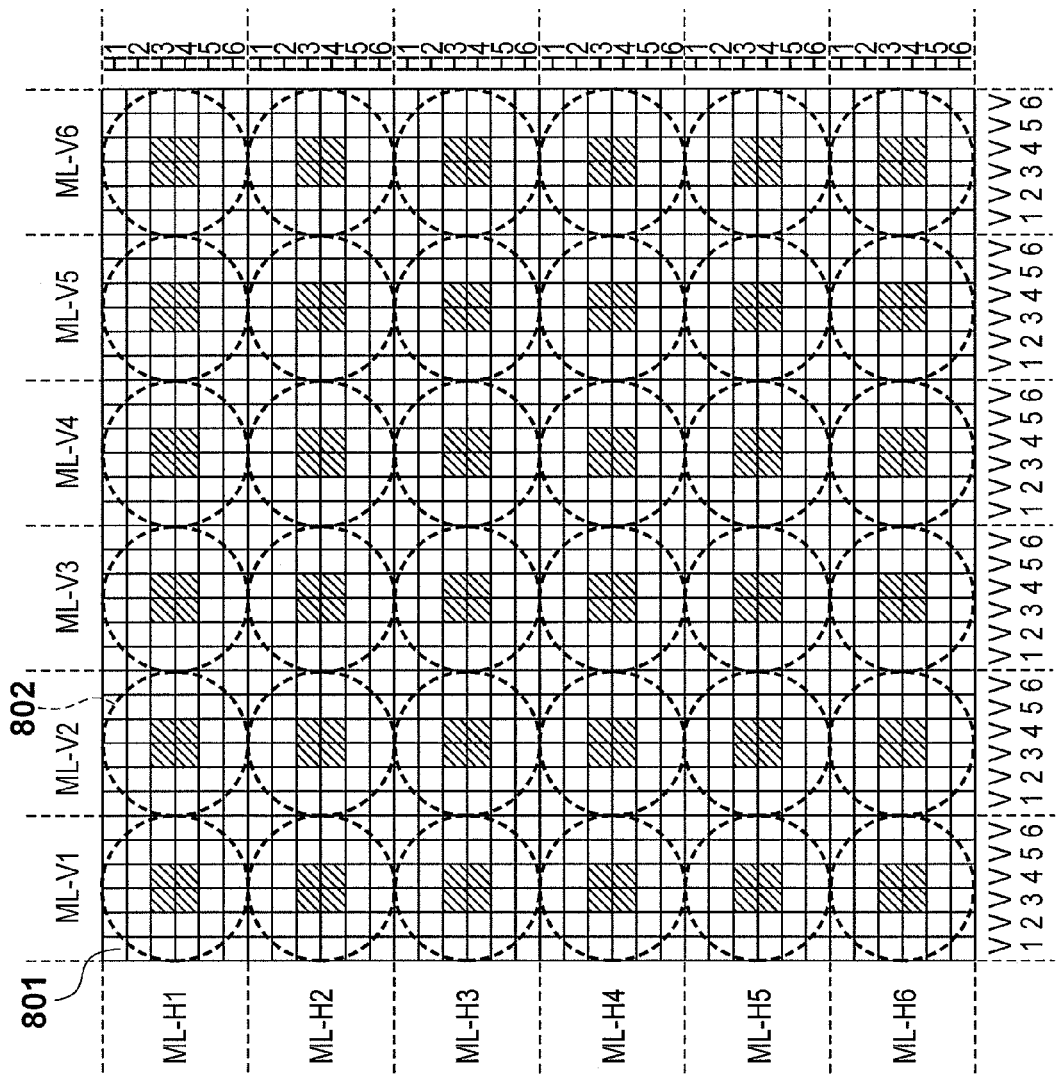
FIG. 6 is a view for explaining a pixel readout position on the image sensor.

The apparatus preferentially reads out a pixel ML-H1V1-H3V3, a pixel ML-H1V1-H3V4, a pixel ML-H1V1-H4V3, and a pixel ML-H1V1-H4V4 which are arranged in a microlens 801 in FIG. 6 and indicted by the hatching. Likewise, the apparatus sequentially reads out pixels arranged at relatively the same positions at each microlens (for example, in the case of a microlens 802 arranged at ML-H1V2, a pixel ML-H1V2-H3V3, a pixel ML-H1V2-H3V4, a pixel ML-H1V2-H4V3, and a pixel ML-H1V2-H4V4). Likewise, a readout control unit 112 performs control to preferentially read out the pixels at pixel array positions H3V3, H3V4, H4V3, and H4V4 in the respective microlenses arranged at ML-H1V3, ML-H1V4, ML-H1V5, ML-H1V6, ML-H2V1, ML-H2V2, ML-H2V3, ML-H2V4, ML-H2V5, ML-H2V6, ML-H3V1, ML-H3V2, ML-H3V3, ML-H3V4, ML-H3V5, ML-H3V6, ML-H4V1, ML-H4V2, ML-H4V3, ML-H4V4, ML-H4V5, ML-H4V6, ML-H5V1, ML-H5V2, ML-H5V3, ML-H5V4, ML-H5V5, ML-H5V6, ML-H6V1, ML-H6V2, ML-H6V3, ML-H6V4, ML-H6V5, and ML-H6V6.

Figure 7:
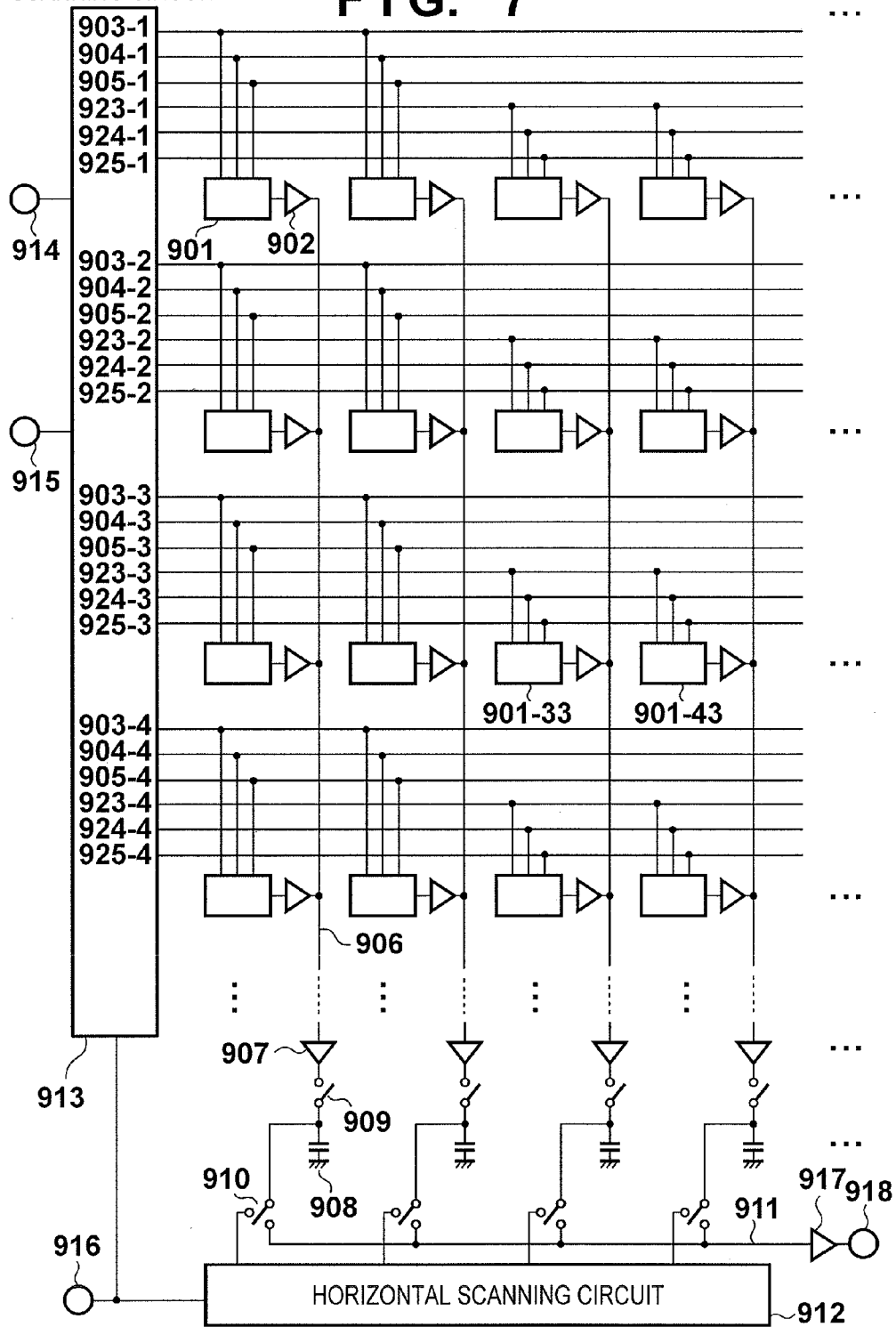
FIG. 7 is a circuit diagram showing the arrangement of a CMOS sensor on which readout operation is performed on a pixel basis.

Readout processing in an XY address image sensor will be described next with reference to FIG. 7. An image sensor 103 includes pixels 901 (the xth row, yth column pixel is written as 901-*yx*) and floating diffusion amplifiers 902 (to be abbreviated as FD amplifiers hereinafter and the xth row, yth column amplifier is written as 902-*yx*). The image sensor 103 also includes row readout control lines 903 (the xth row line is written as 903-*x*), row reset control lines 904 (the xth row line is written as 904-*x*), and row selection lines 905 (the xth row line is written as 905-*x*). The image sensor 103 also includes row readout control lines 923 (the xth row line is written as 923-*x*) for pixels at a central portion of the microlens like the pixels on the third and fourth columns, row reset control lines 924 (the xth row line is written as 924-*x*), row selection lines 925 (the xth row line is written as 925-*x*), column signal lines 906 (the yth column signal line is written as 906-*y*), column amplifiers 907 (the yth column amplifier is written as 907-*y*), column signal buffer capacitors 908 (the yth column capacitor is written as 908-*y*) which charge the outputs of the column amplifiers 907, column signal buffer capacitor control switches 909 (the yth column switch is written as 909-*y*) for turning ON/OFF charging of the column signal buffer capacitors 908, column selection switches 910 (the yth column switch is written as 910-*y*) for sequentially outputting the signals charged to the column signal buffer capacitors 908 to a horizontal signal line 911, a horizontal scanning circuit 912, a vertical scanning circuit 913, a vertical synchronization signal input terminal 914, a readout start row setting input terminal 915, a horizontal synchronization signal input terminal 916, an output buffer amplifier 917, and a video signal output terminal 918.

A case in which data are read out from the CMOS image sensor pixel by pixel will be described next. The charges in pixels 901-33 and 901-43 corresponding to the pixels ML-H1V1-H3V3 and ML-H1V1-H3V4 are read out to FD amplifiers 902-33 and 902-43 under the control of a central row readout control line 923-3. Column amplifiers 907-3 and 907-4 amplify outputs from the FD amplifiers 902-33 and 902-43 via column signal lines 906-3 and 906-4 upon being selected under the control of a central row selection line 925-3. At the same time, column signal buffer capacitor control switches 909-3 and 909-4 are turned on. Outputs from the column amplifiers 907-3 and 907-4 are then charged to column signal buffer capacitors 908-3 and 908-4. After the column signal buffer capacitors 908-3 and 908-4 are charged, the column signal buffer capacitor control switches 909-3 and 909-4 are turned off. The third row signals charged to the column signal buffer capacitors 908-3 and 908-4 are output as follows. That is, the apparatus sequentially opens/closes column selection switches 910-3 and 910-4 under the control of the horizontal scanning circuit 912 to output the signals from the video signal output terminal 918 via the horizontal signal line 911 and output buffer amplifier 917. The apparatus sequentially reads out specific pixels in the central portion in the above manner.

Upon preferentially reading out the pixels indicated by the hatchings in FIG. 6, the apparatus performs readout operation at the portions not hatched in FIG. 6 which correspond to the peripheral portions of the respective microlenses. In addition, as a method other than the method of preferentially reading out the pixels near the center of each microlens and then reading out the unread pixels, it is possible to use a method of preferentially reading out the pixels near the center of each microlens and then reading out all the pixels, regardless of whether they are read pixels or unread pixels, by a readout method similar to a conventional readout method to use the resultant data for recording processing.

It is possible to suppress a display delay with respect to the display unit by performing readout processing upon assigning priority levels to readout pixel positions for each microlens and using the preferentially readout pixels for display. In addition, it is possible to improve the sense of usage when the user performs image capturing while seeing the video displayed on the display unit at the time of image capturing.

Other Embodiments

In addition, as another embodiment, a case in which the apparatus performs readout control switching based on the arrangement of microlenses and pixels and the arrangement of color filters covering the pixels will be described.

FIG. 2A shows the arrangement of microlenses and pixels. With regard to a primary color filter arrangement, it is also possible to use, as a method of covering each unit pixel with a color filter having an R, G, or B hue, either a method of arranging color filters in a Bayer pattern or a method of arranging R, G, and B color filters in a Bayer pattern for each microlens.

Concrete arrangement examples of color filters will be described with reference to FIGS. 8A to 8C. FIG. 8A shows an example of an array in which pixels are arranged on an even number of rows and an even number of columns for each microlens, and an R, G, or B color filter is arranged on each pixel. In such a case, to read one pixel at the same position with respect to each microlens is to read only pixels with the same hue as indicated by the thick-line frames in FIG. 8A, and hence it is necessary to read pixels at a plurality of positions for color reproduction. In contrast to this, when pixels are arranged on an odd number of rows and an odd number of columns for each microlens as shown in FIG. 8B, it is possible to obtain pixels with the respective hues, namely R, G, and B hues, even by reading one pixel at the same position with respect to each microlens, as indicated by the thick-line frames in FIG. 8B. In addition, when R, G, and B color filters are arranged for each microlens as shown in FIG. 8C, it is possible to obtain pixels with the respective hues, namely R, G, and B hues, by reading one pixel at the same position with respect to each microlens, as in the case shown in FIG. 8B.

(Embodiment of CCD)

A case in which a CCD image sensor is used will be described next as an embodiment of the present invention. The first embodiment has exemplified the case of performing readout control with respect to the image sensor using a CMOS image sensor as readout control on a line basis. However, it is possible to configure the apparatus to perform readout control with respect to an image sensor using a CCD image sensor on a line basis.

Figure 9:
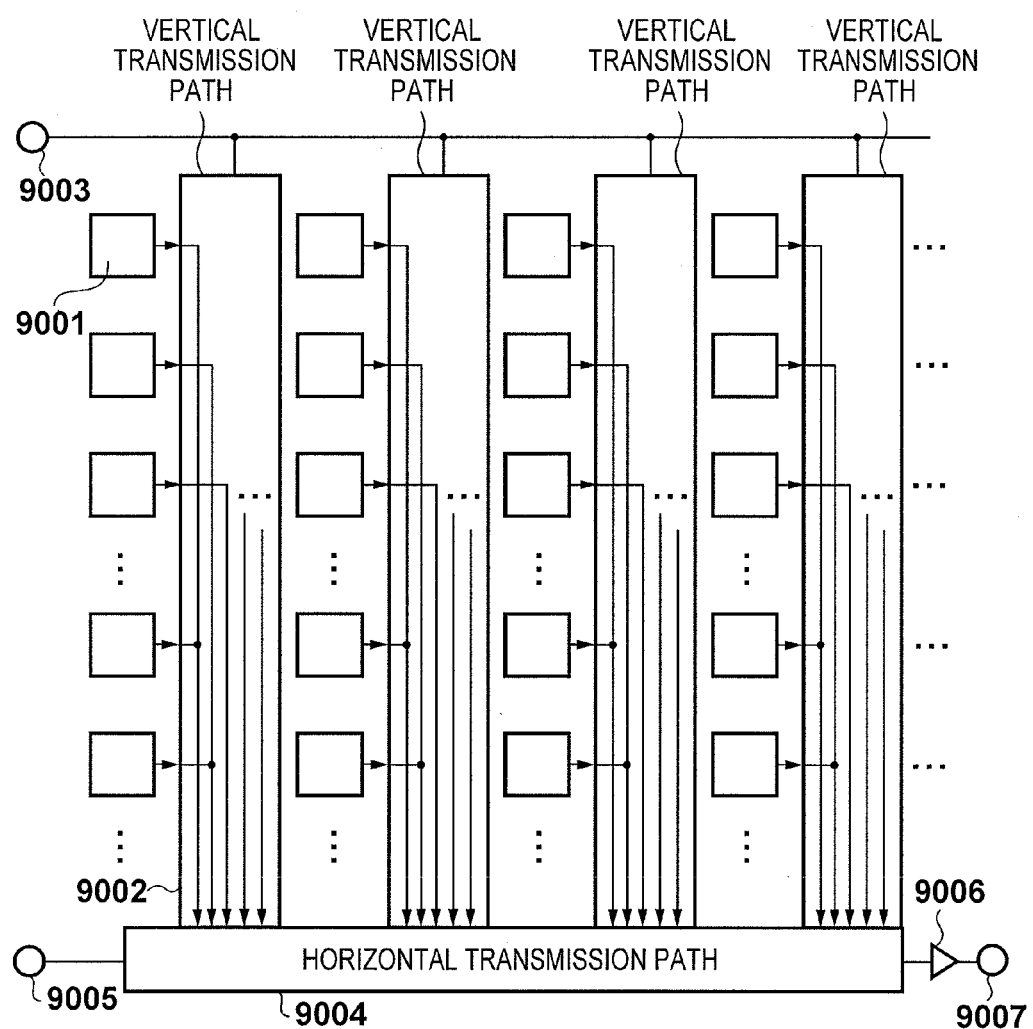
FIG. 9 is a circuit diagram showing the arrangement of a CCD sensor.

The arrangement of a microlens array 102 and image sensor 103 is the same as that described with reference to FIGS. 2A to 2C in the first embodiment, and hence a description of the arrangement will be omitted. Readout processing for a CCD image sensor used as an image sensor will be described below with reference to FIG. 9. This image sensor includes pixels 9001 (the xth row, yth column pixel is written as 9001-yx), vertical transmission paths 9002, a charge readout control line 9003 which supplies control pulses to the vertical transmission paths, a horizontal transmission path 9004, a charge transfer control line 9005 corresponding to the horizontal transmission path, a floating diffusion amplifier 9006 (to be abbreviated as an FD amplifier hereinafter), and a video signal output terminal 9007. After the elapse of a predetermined accumulation time since photoelectric conversion of image light incident on the pixels 9001, the apparatus transfers charges to the vertical transmission paths 9002 in accordance with a control pulse from the charge readout control line 9003. The vertical transmission paths can transfer charges on a row basis by using an arrangement configured to divisionally transfer charges to a plurality of rows based on the same idea as that of a 2:1 interlaced scanning in a television system which divisionally outputs the data of one image to odd-numbered rows and even-numbered rows. This case will exemplify vertical transmission paths capable of divisional processing for every three rows. A vertical transmission path is used as a common transmission path for pixels corresponding to row numbers 3n+1 (n is a positive integer), such as pixels 9001-11, 9001-14, and 9001-17, and row numbers are allocated to 3n+2 and 3n+3, thereby transmitting all pixels to the horizontal transmission path 9004 via three vertical transmission paths. The horizontal transmission path 9004 transmits data to the FD amplifier 9006 provided ahead of the horizontal transmission path in response to a charge transfer pulse from the charge transfer control line 9005. The FD amplifier 9006 amplifies the data. The amplified data is output from the video signal output terminal 9007.

With this arrangement, the apparatus is configured to perform readout control while assigning priority levels to readout pixel positions for each microlens in the CCD image sensor. This makes it possible to suppress a display delay with respect to the display unit.

In addition, although the arrangement for vertically transmitting pixels for every three rows has been described, the apparatus may be configured to transfer pixels via a different number of rows at a time.

Figure 10:
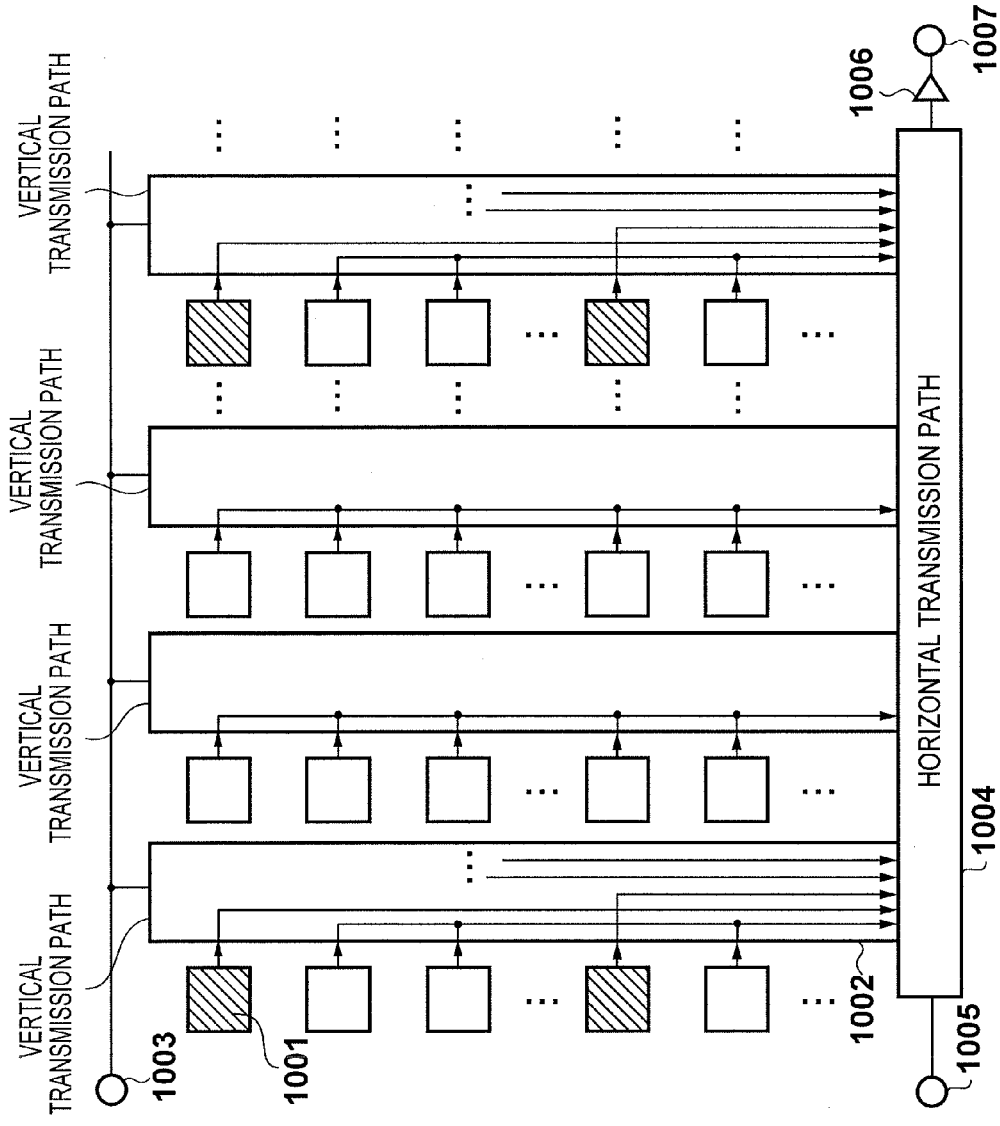
FIG. 10 is a circuit diagram showing the arrangement of a CCD sensor having dedicated vertical transmission paths.

A case in which the apparatus is configured to use dedicated vertical transmission paths will be described next with reference to FIG. 10 as an embodiment using a CCD image sensor. This image sensor includes pixels 1001 (the xth row, yth column pixel is written as 1001-yx), vertical transmission paths 1002, a charge readout control line 1003 which applies a control pulse to the vertical transmission paths, a horizontal transmission path 1004, a charge transfer control line 1005 for the horizontal transmission path, a floating diffusion amplifier 1006 (to be abbreviated as an FD amplifier), and a video signal output terminal 1007. The apparatus is configured to transmit charges to the horizontal transmission path from each pixel indicated by shading as in a pixel 1001-11 via a dedicated vertical transmission path and transmit charges from the remaining pixels via a common vertical transmission path. The horizontal transmission path 1004 transmits data to the FD amplifier 1006 provided ahead of the horizontal transmission path in response to a charge transfer pulse from the charge transfer control line 1005. The FD amplifier 1006 amplifies the data. The amplified data is output from the video signal output terminal 1007.

In this way, the apparatus can read out desired pixels at high speed. The apparatus is configured to perform readout control while assigning priority levels to readout pixel positions for each microlens in the CCD image sensor. This makes it possible to suppress a display delay with respect to the display unit.

(Embodiment with Data in Memory)

A signal processing unit 105 performs various types of processing for pixels 103 preferentially read out from an image sensor such as a CMOS or CCD sensor. A display processing unit 107 performs display processing for the pixels and displays the resultant image on a display unit 108. A recording processing unit 109 performs recording processing for the recording image obtained by combining the pixels preferentially read out by a readout control unit 112 with all the remaining pixels, and records the resultant data on a recording unit 110. It is also possible to store once the pixels 103 read out from an image sensor such as a CMOS or CCD sensor in a memory 106 and then display and record the data.

An example of processing data in the memory 106 will be described. Assume that pixel data are stored in a raster scan scheme with the memory address being sequentially incremented from memory address 0. In this case, the first row, first column data is stored at address 0, the first row, second column data is stored at address 1, and the first row, third column data is stored at address 1. If there are 1,024 columns per row, the second row, first column data is stored at address 1024.

Assume that four pixels, for example, a pixel ML-H1V1-H3V3, a pixel ML-H1V1-H3V4, a pixel ML-H1V1-H4V3, and a pixel ML-H1V1-H4V4, are preferentially read out, as in a case in which the pixels indicated by the hatchings in FIG. 6 are preferentially read out. In this case, the apparatus reads out the data of address values such as address 2050 (second row, third column pixel), address 2051 (second row, fourth column pixel), address 3074 (third row, third column pixel), and address 3075 (third row, fourth column pixel) from the memory. The signal processing unit 105 performs various types of processing for the preferentially readout pixels. The display processing unit 107 performs display processing for the pixels. The resultant image is displayed on the display unit 108. The recording processing unit 109 performs recording processing for the recording image obtained by combining the pixels preferentially read out by the readout control unit 112 with all the remaining pixels, and records the resultant data on a recording unit 110.

Assigning priority levels to readout pixel positions for each microlens and performing readout processing in this manner can suppress a display delay with respect to the display unit and improve the sense of usage when the user performs image capturing while seeing the video displayed on the display unit at the time of image capturing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2013-062860, filed Mar. 25, 2013, and 2014-029968, filed Feb. 19, 2014 which are hereby incorporated by reference herein in their entirety.

What is claimed is:

1. An image capturing apparatus comprising:
    an image sensor having photoelectric conversion elements as pixels and a lens array in which a plurality of lenses are two-dimensionally arrayed in a matrix pattern on the photoelectric conversion elements, which is arranged to make light transmitted through each lens of said lens array be incident on a plurality of pixels;
    a display unit configured to display video data read out from said image sensor;
    a recording unit configured to record the video data read out from said image sensor;
    a readout control unit which has a first readout mode of reading out video data of pixels in first regions coinciding with a position relative to each lens of said lens array from said image sensor and a second readout mode of reading out video data of pixels in second regions other than the first regions from said image sensor; and
    a control unit configured to perform control, after reading out video data from said image sensor in the first readout mode, to read out video data from said image sensor in the second readout mode and display, on said display unit, a video obtained from the video data read out in the first readout mode, and to record the video data read out in the first and the second readout modes on said recording unit.

2. The apparatus according to claim 1, wherein said image sensor comprises an image sensor based on an XY address readout scheme.

3. The apparatus according to claim 1, wherein a pixel array of said image sensor is a Bayer pattern.

4. The apparatus according to claim 1, wherein a color filter is arranged for each lens of said lens array.

5. The apparatus according to claim 1, wherein the first region includes a central pixel of each lens of said lens array.

6. The apparatus according to claim 1, wherein the first region exists every predetermined number of lines of said image sensor.

7. The apparatus according to claim 1, wherein the first region is set on a pixel basis in said image sensor.

8. The apparatus according to claim 1, wherein said control unit causes said display unit to sequentially display video data read out in the first readout mode and causes said recording unit to record video data read out in the first readout mode and the second readout mode as each frame of moving image data.

9. A method of controlling an image capturing apparatus including an image sensor having photoelectric conversion elements as pixels and a lens array in which a plurality of lenses are two-dimensionally arrayed in a matrix pattern on the photoelectric conversion elements, which is arranged to make light transmitted through each lens of the lens array be incident on a plurality of pixels, comprising:
    a display step of displaying video data read out from the image sensor;
    a recording step of recording the video data read out from the image sensor;
    a readout control step having a first readout mode of reading out video data of pixels in first regions coinciding with a position relative to each lens of the lens array from the image sensor and a second readout mode of reading out video data of pixels in second regions other than the first regions from the image sensor; and
    a control step of performing control, after reading out video data from the image sensor in the first readout mode, to read out video data from the image sensor in the second readout mode and display, in the display step, a video obtained from the video data read out in the first readout mode, and to record the video data read out in the first and the second readout modes on the recording unit.

* * * * *